United States Patent [19]

Ueyama et al.

[11] 4,183,637

[45] Jan. 15, 1980

[54] METHOD AND APPARATUS FOR FORMING PHOSPHOR SCREEN OF COLOR PICTURE TUBES

[75] Inventors: Takehiko Ueyama; Masahiro Nishizawa, both of Mobara; Eiichi Yamazaki, Ichihara; Iwao Ogura, Tokyo, all of Japan

[73] Assignee: Hitachi, Ltd., Japan

[21] Appl. No.: 846,536

[22] Filed: Oct. 28, 1977

[30] Foreign Application Priority Data

Nov. 12, 1976 [JP] Japan ................................ 51-135301

Nov. 29, 1976 [JP] Japan ................................ 51-142281

[51] Int. Cl.[2] .............................................. G03B 41/00

[52] U.S. Cl. ........................................................ 354/1

[58] Field of Search ................ 354/1; 96/36.1; 427/68

[56] References Cited

U.S. PATENT DOCUMENTS 3,828,358 8/1974 Miyaoka .................................. 354/1

4,070,498 1/1978 Nishizawa et al. ............... 96/36.1 X

*Primary Examiner*—John Gonzales

*Attorney, Agent, or Firm*—Craig and Antonelli

[57] ABSTRACT

A method of forming a stripe type phosphor screen on inner surface of a face plate of a color picture tube or CRT through the irradiation with light stripes. A single linear light source is employed in combination with a plurality of juxtaposed prisms between the face plate and the linear light source with the taper angles of the prisms being continuously varied so that a plurality of virtual linear light sources may be observed from any points on the inner surface of the face plate with the distances between mid-points of the virtual linear light sources taking optimum values at respective positions on the inner surface of the face plate. With such arrangement, an improved phosphor screen composed of phosphor stripes of three colors having uniform stripe width can be formed over the whole inner surface of the face plate by using a single linear light source without requiring driving apparatus for moving the light source to different positions.

12 Claims, 9 Drawing Figures

METHOD AND APPARATUS FOR FORMING PHOSPHOR SCREEN OF COLOR PICTURE TUBES

LIST OF PRIOR ART REFERENCE

The following references are cited to show the state of the art:

1. Japanese Patent Publication No. 30991/75
2. Japanese Patent Publication No. 29635/76
3. Japanese Patent Laid-Open No. 136280/76

The present invention relates to a method of forming a phosphor screen for a color picture tube through the irradiation with light stripes and apparatus for carrying out the same. In particular, the invention concerns with a method of forming a phosphor screen composed of phosphor stripes of three colors having a uniform stripe width for a color picture tube having a stripe type phosphor screen by using a single linear light source in combination with a plurality of prisms.

The invention will be better understood from the description taken in conjunction with the accompanying drawings, in which.

Figure 4B:
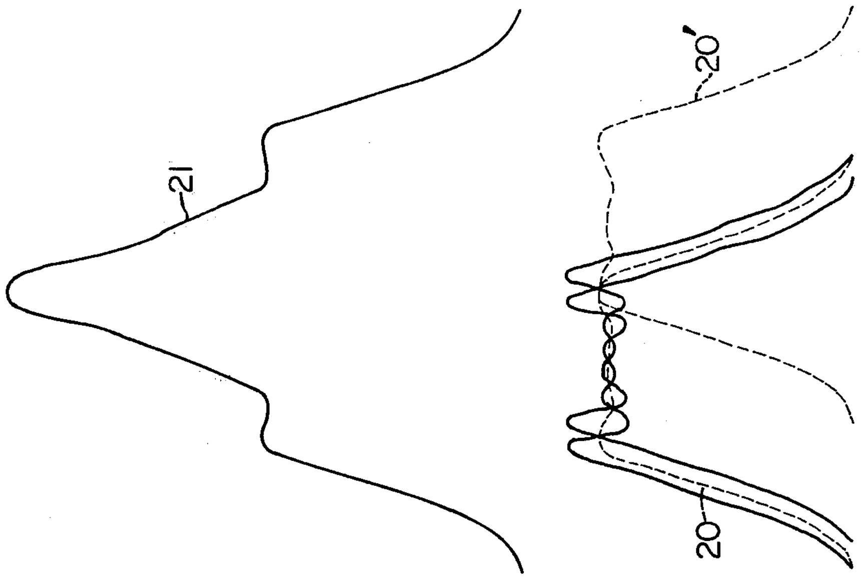
Figure 4A:
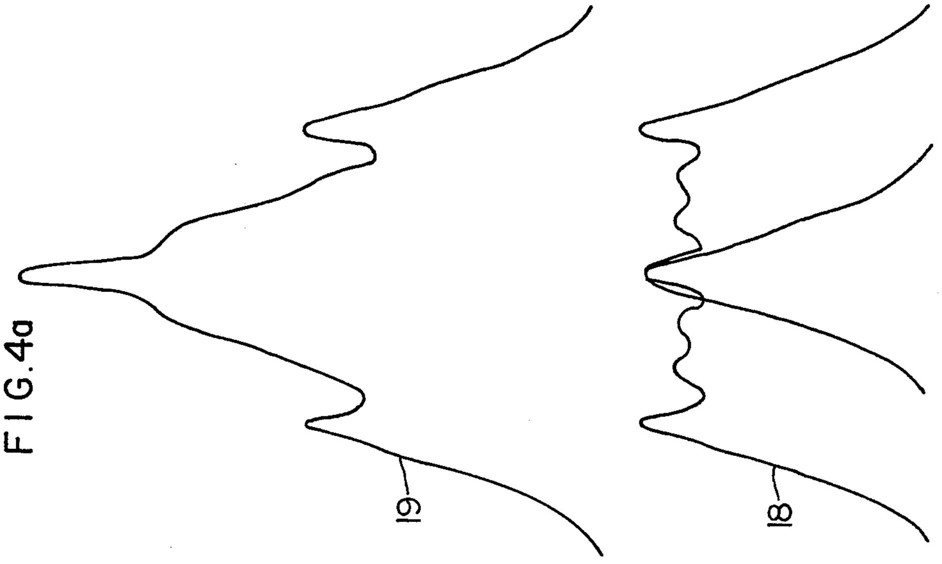
Figure 5:
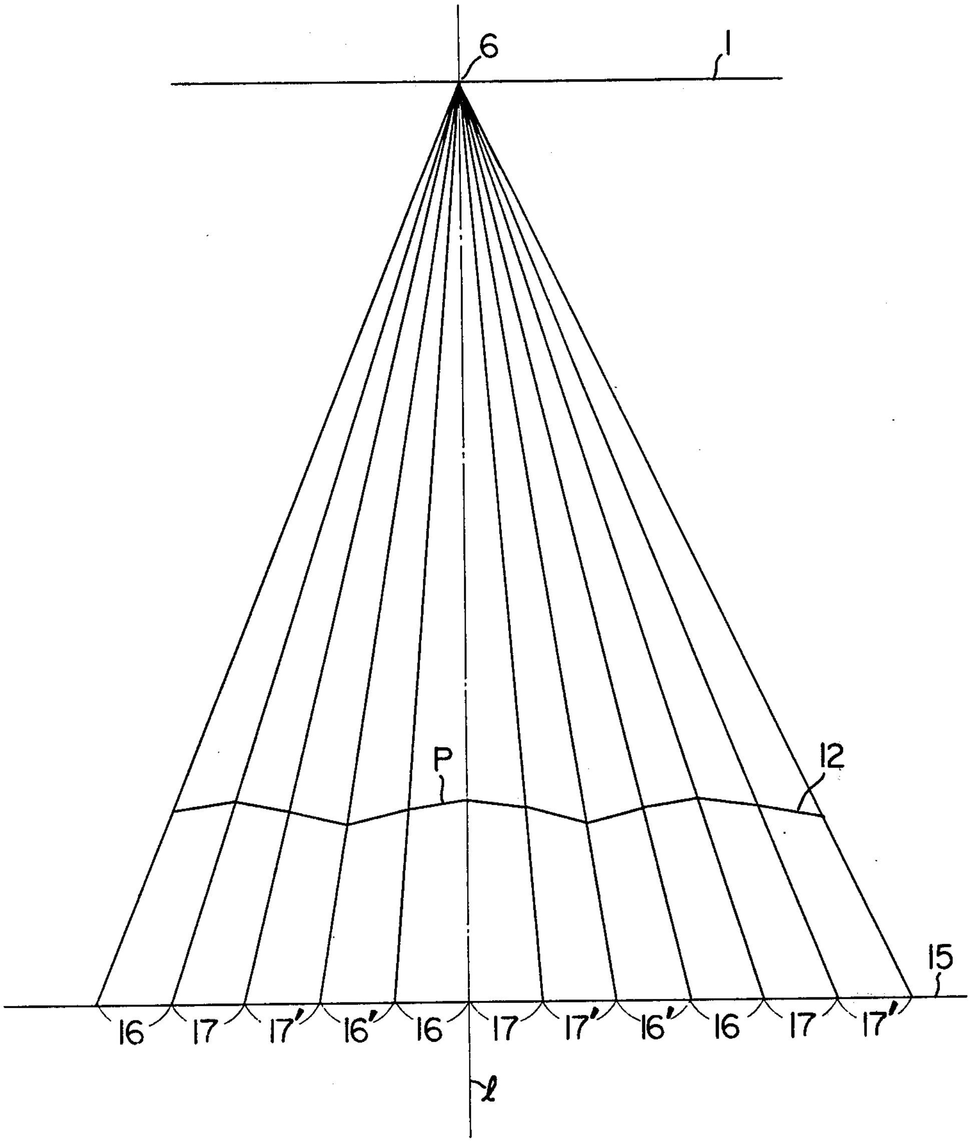
Figure 6:
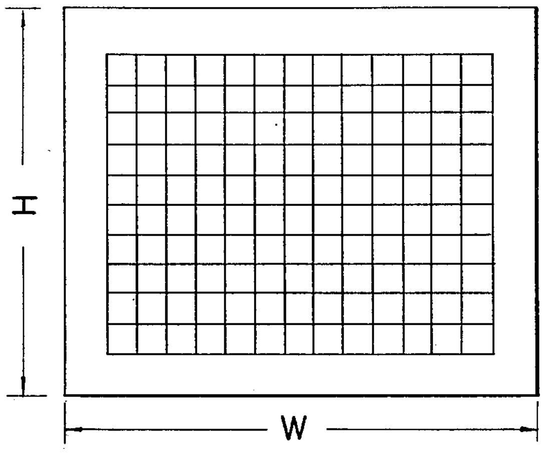
Figure 7A:
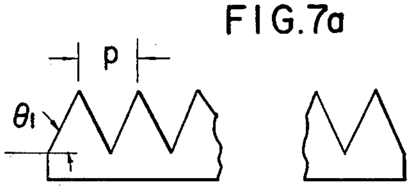
Figure 7B:
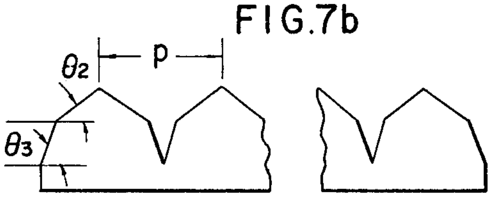

FIGS. 4*a* and 4*b* graphically illustrate light intensity distributions generated actually in carrying out a method of forming a phosphor screen through irradiation with light stripes according to the invention;

FIG. 5 is to illustrate conditions under which four virtual linear light sources can be produced in carrying out a method of forming a phosphor screen with irradiation of light stripes according to the teachings of the invention;

FIG. 6 is a front view of a prism device which is used in the case of carrying out the method of forming a phosphor screen according to the teachings of the present invention; and FIGS. 7*a* and 7*b* show an enlarged view of a plurality of prisms disposed in the individual sections of the prism device shown in FIG. 6.

Figure 1:
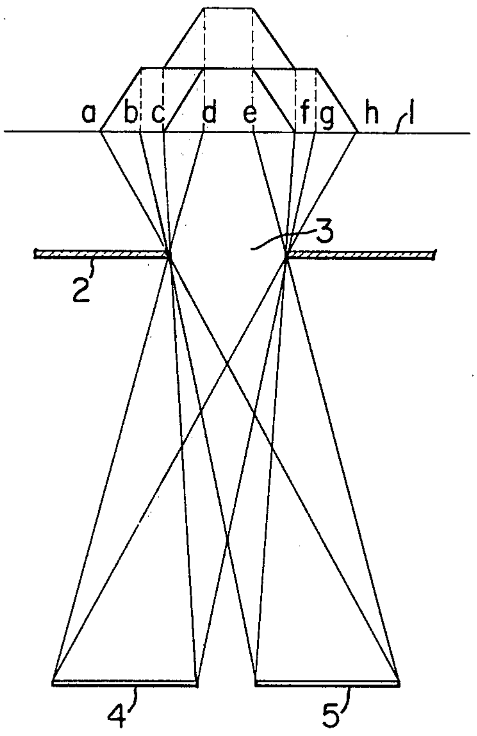
FIG. 1 PRIOR ART
FIG. 1 illustrates a method of forming a phosphor screen for a color picture tube through irradiation with light by using two light source disposed at different positions.

In a color picture tube having a face plate or panel formed with phosphor stripes and/or black stripes over the whole inner surface thereof, each of which stripes has a width narrower than that of slots formed in a shadow mask, there has been already proposed a method of forming such stripes according to which the inner surface of the face plate of the color picture tube is exposed to two light sources disposed with a predetermined distance therebetween in such a manner that two light stripes from the light sources may be superposed with each other on the inner surface of the face plate at regions to be formed with the phosphor or black stripes. FIG. 1 illustrates schematically an example of such hitherto known method in a side view. Referring to FIG. 1, numeral 1 denotes the inner surface of face plate or screen panel of a color picture tube which has a shadow mask 2 disposed therein with a predetermined distance spaced from the panel inner surface 1. The shadow mask 2 is formed with elongated slots 3 extending perpendicularly to the plane of the drawing. Light sources 4 and 5 are also disposed perpendicularly to the plane of the drawing. Light from the light source 4 passes through the slot 3 of the shadow mask 2 thereby to produce an umbral region dg and penumbral regions cd and gh on the inner surface of the face plate. In a similar manner, light from the light source 5 will produce an umbral region bc and penumbral regions ab and ef. Consequently, the light beams projected from the respective light sources 4 and 5 are superposed on each other to produce an umbral region de and penumbral regions ad and eh. With such irradiation or exposure method, it is certainly possible to obtain an adequately steep gradient in light intensity distribution along the boundary edge of the stripe for any given width thereof by selecting correspondingly the distance between the light sources 4 and 5. In this way, the width of stripe can be controlled with high accuracy. In this connection, it is however noted that mercury-arc lamps of an ultrahigh voltage are commonly used as the light sources 4 and 5. Since the mercury-arc lamp includes a quartz tube having a considerable wall thickness in addition to an external tube disposed around the quartz lamp with a predetermined distance therefrom for cooling the lamp thereby to lengthen the use life thereof, restrictions are inevitably imposed on the selection of the distance between the midpoints of the juxtaposed mercury-arc lamps. Thus, it is impossible or at least very difficult in practice to select the optimum distance between the light sources. Further, use of two mercury-arc lamps will of course involve undesirably increased power consumption.

There is also known a method according to which a single mercury-arc lamp is employed and the irradiation or exposure of the panel inner surface for formation of stripes is effected sequentially from two different positions by correspondingly moving the mercury-arc lamp. This method requires thus a transporting mechanism for moving the single mercury-arc lamp. Besides, such sequential irradiation will not bring about the equivalent result to the simultaneous irradiation through two light source in the case where a photoresist material of reciprocity law failure type is used.

In view of the disadvantages of the hitherto known methods of forming phosphor and/or black stripes on the inner surface of face plate of a stripe type color picture tube, the present invention is intended to propose a method of forming such stripes in which a single linear light source is used in such a manner as if a plurality of linear light sources were used in appearance and distance between such light sources can be arbitrarily selected.

With the above object in view, there is proposed according to an aspect of the invention an arrangement in which a plurality of prisms are juxtaposed to one another between a single linear light source and a panel inner surface to be formed with phosphor and/or black stripes in such an array that the single linear source may be seen as a plurality of linear light sources as observed from the side of the panel inner surface.

Next, the invention will be described in detail in conjunction with preferred examples shown in the accompanying drawings.

Figure 2:
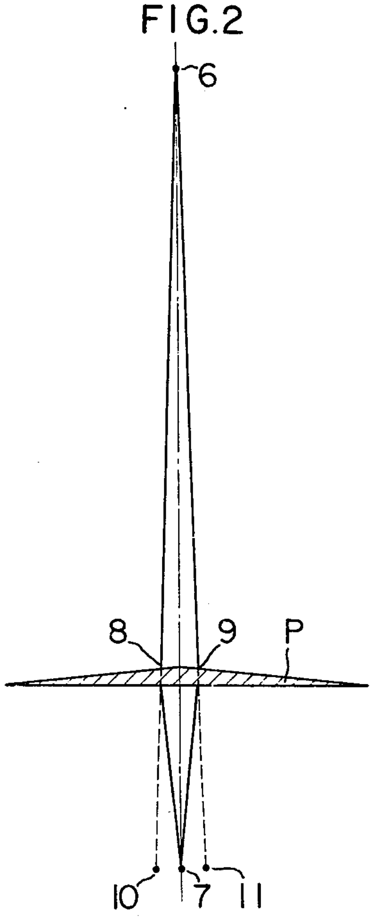
FIG. 2 illustrates schematically the principle of the invention on which two virtual point light sources are produced.

FIG. 2 illustrates schematically the principle of the invention. In the figure, reference numeral 6 denotes a point on the inner surface of the face plate of a color picture tube, while numeral 7 denotes a single point light source. A single prism P which is shown enlarged for the purpose of illustration is interposed between the point 6 and the point light source 7. When the light source 7 is viewed from the point 6, the former can be observed as positioned at locations 10 and 11, since the light ray emitted from the light source 7 and refracted at points 8 and 9 on the inclined surfaces of the prism P will fall together at the point 6.

The present invention teaches the use of prism P in such a manner that a single linear light source can be observed in appearance as two juxtaposed linear light sources having a same width when viewed from the face plate at any point thereof. To obtain such effect, certain conditions have to be satisfied, which will be noted described with reference to FIG. 3.

Figure 3:
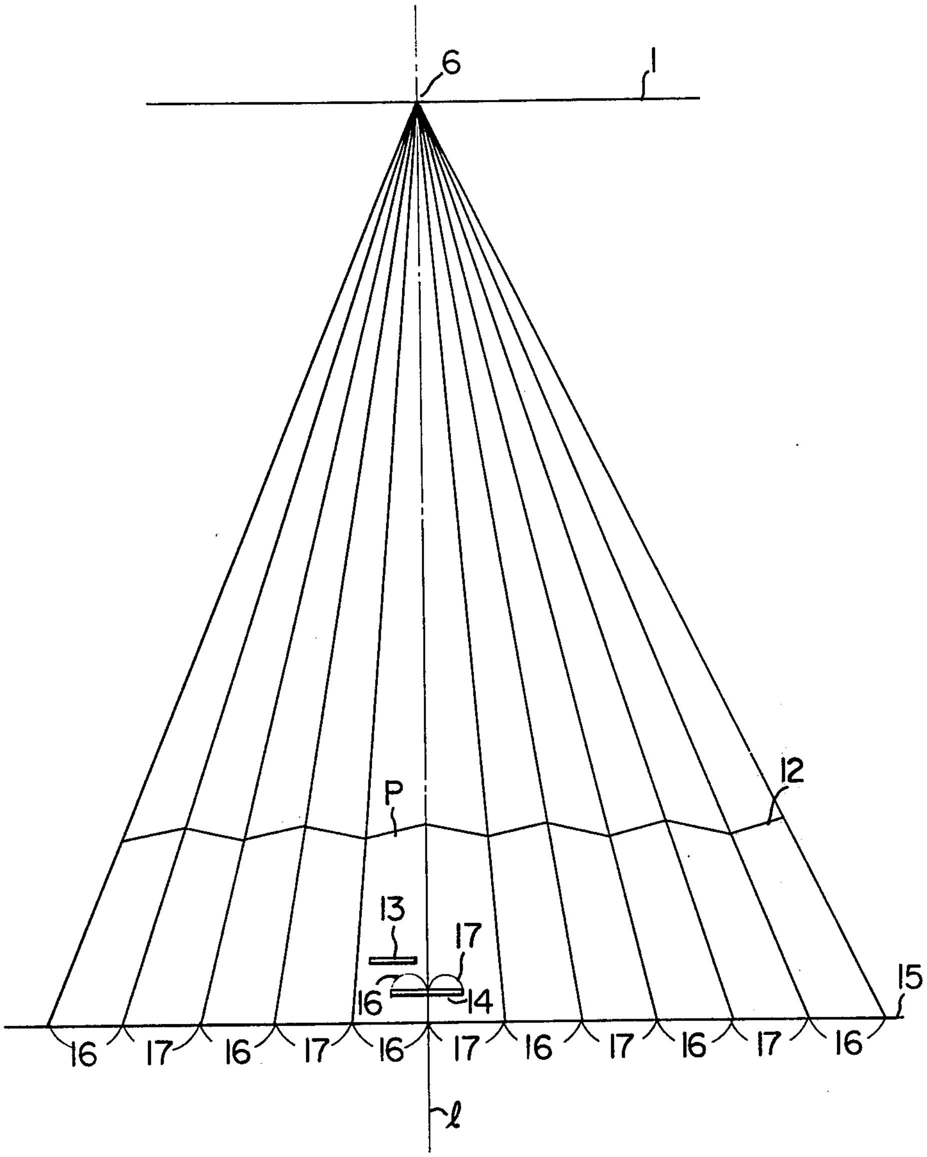
FIG. 3 is to illustrate the conditions imposed on the method of forming a phosphor screen according to the teachings of the invention.

In the first place, it is assumed that the size or width of a single prism is greater than that of the light source when viewed from a point on the inner surface of the face plate. Under such condition, if the light source as denoted by numeral 13 in FIG. 3 is located between the inclined surfaces of the single prism P, the light source as a whole will be observed as deviated to the left-hand side as viewed in FIG. 3. Further, when the light source is positioned on the axis l passing through a top of the prism P, as is designated by numeral 14, and the light source is divided into two halves 16 and 17 each having an equal width, the left half 16 of the light source 14 will then be observed as being displaced to the left, while the right half 17 will be observed as being displaced to the right.

In practice, the leftward displaced portion and the rightward displaced portion of the light source will be overlapped with each other, as shown in FIG. 2. However, in general, the areas of these deviated or displaced portions will not become equal to each other.

On the other hand, when the width of the single light source is adequately large as compared with one prism P, as is designated by reference numeral 15, minute portions of the light source observed as being displaced to the left and to the right can be viewed in a regular pattern, whereby a pair of virtual linear light sources each having a same width can be observed. However, when the ratio between the width of the light source and that of the single prism remains within the range of 3 to less than 5 even if the former is greater than latter, the areas of the portions observed as being displaced to the left and to the right, respectively, will become different from each other, whereby the two virtual light sources will have different widths.

After experiments, the inventor of the application has found that the size or width of the light source which is at least five times as great as that of the single prism will in effect produce a pair of virtual linear light sources each having same width and uniform intensity distribution.

When the width of the light source is five times as large as that of the single prism P, the profile of the light intensity distribution as produced over the inner surface of the face plate will take a form of a trapezoid as a whole. However, such trapezoid profile is synthesized from a number of profiles formed by light rays passing through individual prism planes, an improved uniform intensity distribution is produced by vibrating the whole prism in the direction perpendicular to the axis of the light source. It has however been found that the light intensity distribution produced by a single light source will not in practice take a form of trapezoid such as shown in FIG. 1 but produce a diffraction pattern 18 such as illustrated in FIG. 4*a*. Consequently, mere superposition of two distribution profiles produced by the light source having in particular a narrow width will bring about a profile having a remarkable uneveness. When a pair of light sources are used with distance between the midpoints thereof being set at 0.4 mm to 0.9 mm, the unevennesses will cancel out each other, thereby to produce a substantially trapezoid profile such as denoted by a curve 20 in FIG. 4*b*. Further, when two sets of such paired light sources (the number of which amounts to four) are employed with the distances between the mid-points of the paired light source being selected at a value in the range of 0.4 to 0.9 mm, a substantially ideal profile as represented by curve 21 can be obtained.

On the other hand, when the taper angle of the prism planes is selected at a constant, then the amount of deviation of the light source will become different at peripheral portions and middle portions of the inner surface of the face plate. In order to evade from such disadvantages, the taper angles of the prism planes may be continuously varied so that the distance to the virtual light sources will become constant over the whole inner surface of the face plate.

The optimum distance between mid-points of the virtual light sources will vary in dependence on the practical specifications of the color picture tube. In general, it is preferred that the width of the light source is selected at a value in the range of 0.5 to 1.5 mm, while the taper angles of the prism planes be selected so that the distance between the virtual light sources may be in the range of 1.0 mm to 3.0 mm. Alternatively, arrangement may be made such that four virtual light sources each having a width of 0.5 to 1.0 mm may make an appearance with the taper angles of the prism planes being selected so that the distance between the mid-points of the virtual light sources is in the range of 0.2 to 1.0 mm, 1.0 to 3.0 mm and 0.2 to 1.0 mm, respectively.

FIG. 5 illustrates an arrangement of individual component prisms with the taper angles thereof selected in the range specified above so that four virtual light sources make an appearance. When the width of the light source as denoted by reference numeral 15 is adequately greater than that of the single prism P, minute portions 17 observed as being displaced considerably to the right and minute portions 17' observed as being displaced slightly to the right as well as minute portions 16 and 16' observed as being displaced to the left considerably and slightly, respectively, will be positioned in a regular array in the whole image of the light source, which results in appearance of four virtual linear light sources having equal width for observation from the point 6 on the inner surface of the face plate.

Next, the invention will be described in conjunction with concrete examples. For a stripe type color picture tube of 20 inch size in which beam deflection angle is selected at 110° and focussing is carried out at a succeeding stage, the slot width of the shadow mask may be selected at 0.3 mm in the middle portion of the face plate with the stripe width being at 0.20 mm. In the peripheral portions of the shadow mask, the slot width may be selected at 0.24 mm while the stripe width selected at 0.16 mm. Under these conditions, the distance between the mid-points of the virtual light sources for irradiation upon forming the phosphor stripes on the inner surface of the face plate of the color picture tubes may be selected at 1 mm. A number of individual prisms each having a prism plane in parallel with the axial direction of the light source are juxtaposed adjacent to one another at a position distanced for 50 mm from the real light source with the pitch of the prisms being selected at 0.1 mm, while the taper angles thereof are continuously varied from 1° at a position corresponding to the center portion of the face plate to 0.5° at the peripheral portions thereof. With such arrangement, it is possible to form an improved phosphor screen composed of green, blue and red phosphor stripes having regular width all over the inner surface of the face plate.

In a color picture tube according to other specifications, following dimensions may be adopted for optimum results. Namely, the width of the light source is in general selected at a value in the range of 0.5 to 1.5 mm with the distance between the mid-points of the virtual light sources being set at a value in the range of 1.0 to 2.0 mm when observed from the center of the face plate and at a value in the range of 1.5 to 3.0 mm when observed from the peripheral portion thereof, or alternately, four virtual light sources having width of 0.5 to 1.0 mm may be observed with the distance among the mid-points of the virtual light sources being in the ranges of 0.4 to 0.9 mm, 1.0 to 2.0 mm and 0.4 to 0.9 mm, respectively, when viewed from the center of the face plate and in the ranges of 0.4 to 0.9 mm, 1.5 to 3.0 mm and 0.4 to 0.9 mm, respectively, when viewed from the peripheral portion. These values or ranges can be established by correspondingly selecting the taper angles of the individual prisms.

As a practical example, a stripe type color picture tube of 20 inch size in which beam deflection angle is selected at 110° and focussing is carried out at a succeeding stage was manufactured. The slot width of the shadow mask was selected at 0.3 mm in the middle portion of the face plate with the stripe width being at 0.20. In the peripheral portion of the shadow mask, the slot width was at 0.24 mm with the stripe width at 0.12 mm. Under these conditions, the distance between the mid-points of the virtual light sources for irradiation upon forming the phosphor stripes on the inner surface of the face plate was selected at 1 mm when observed from the center thereof and at 2 mm when observed at the peripheral portion.

A number of individual prisms each having a prism plane extending in parallel with the axial direction of the light source were juxtaposed adjacent to one another at a position distanced for 50 mm from the real light source with the pitch of the individual prisms being selected at 0.1 mm, while the taper angles thereof were continuously varied from 1° at a location corresponding to the center of the face plate to 0.5° at the peripheral portion thereof. With such arrangement, an improved phosphor screen could be formed over the whole inner surface of the face plate, which was composed of green, blue and red phosphor stripes having uniform width.

As will be appreciated from the foregoing description, the present invention teaches such arrangement in which a plurality of prisms are juxtaposed to one another and interposed between the light source and the inner surface of the face plate so that a plurality of virtual light sources make an appearance when observed from the face plate with the distance among the mid-points of the virtual light sources being arbitrarily selected. With such arrangement, the transporting mechanism required for moving a single light source to two different positions in the hitherto known arrangement can be spared and it becomes possible to form a phosphor screen composed of G, B and R phosphor stripes having uniform width. It will be self-explanatory that the invention can also be applied to the case in which the width of the black stripes and phosphor stripes are greater than the slot width of the shadow mask.

Next, FIG. 6 shows a front view of the prism device which is used in the case of carrying out the method of forming a phosphor screen with irradiation of plural linear light sources in appearance according to the teachings of the present invention. The prism device is provided with small sections of at least 130 pieces, and a plurality of micro-prisms having a same taper angle are disposed on each of the 130 sections. The prism device has a size of approximately 145 mm (H) in height and 185 mm (W) in width and is provided with the 130 sections each of which has a size of approximately 13.1 mm by 13.1 mm. For example, in the case of carrying out the method of forming a phosphor screen of a color picture tube of 22 inch, 110° deflection and postdeflection focus, most preferably a distance between mid-points of virtual linear light sources is approximately 1 mm around the center of the face plate and approximately 2 mm around the periphery of the face plate (a distance of 250 mm from the center of the face plate). For that, the prism device is disposed at the distance of 95 mm from the light source.

FIG. 7*a* is an enlarged view of a plurality of micro-prisms which are disposed in each of the sections of the prism device used in the case of carrying out the method of forming a phosphor screen through irradiation with two virtual linear light sources according to the present invention. The micro-prisms disposed in each of the sections have a same taper angle, and the taper angles of the micro-prisms disposed in the section are arranged to decrease continuously and gradually from the center of the prism device to the periphery of the prism device. For example, the taper angle $\theta_1$ of the micro-prisms in the section of the prism device is about 0.009 radian at the center and about 0.005 radian at the peripheral section which is located at the position of 70 mm to the right and 45 mm above from the center of the prism device. However, the pitch P of the micro-prisms is about 0.18 mm independently of the location of the sections. FIG. 7*b* shows an enlarged view of a plurality of micro-prisms which are disposed in each of the sections of the prism device used in the case of carrying out the method of forming a phosphor screen through irradiation with four virtual linear light sources according to the teachings of the present invention. The taper angles ($\theta_2$, $\theta_3$) of the micro-prism disposed in the sections from the center of the prism device to the periphery of the prism device are arranged to decrease continuously and gradually like the prism device used for forming a phosphor screen through irradiation with two linear light sources. For example, one taper angle $\theta_2$ is about 0.007 radian at the center section and about 0.004 radian at the peripheral section which is located at the position of 70 mm to the right and 45 mm above from the center of the prism device. The other taper angle $\theta_3$ is about 0.011 radian at the center section and about 0.005 radian at the peripheral section which is located at the position of 70 mm to the right and 45 mm above from the center of the prism device. However, the pitch P of the micro-prisms disposed in all the sections is about 0.18 mm independently of the location of the sections.

What is claimed is:

1. A method of forming a phosphor screen of a color picture tube through irradiation with light, comprising the steps of:

locating a single real linear light source in parallel with an inner surface of a face plate of said color picture tube at a predetermined distance from said inner surface; and interposing prism means including a plurality of prisms juxtaposed adjacent to each other between said linear light source and said inner surface for causing said real light source to give an appearance of a plurality of virtual linear light sources when observed from every point on said inner surface of the face plate; each prism providing a pair of virtual linear light sources, each having the same width and uniform intensity distribution.

2. A method according to claim 1, wherein prism planes of said juxtaposed prisms are disposed in parallel with axial direction of said linear real light source.

3. A method according to claim 2, wherein pitch of said plural juxtaposed prisms is selected smaller than one-fifth of the width of said real light source.

4. A method according to claim 1, further comprising the step of vibrating said whole prisms in a direction perpendicular to the axis of said linear light source, thereby forming uniform light intensity distribution at any points on the face plate.

5. A method according to claim 1, wherein each of said prisms comprises a base surface substantially in parallel to said inner surface of the face plate and at least a pair of light-refracting surfaces crossing said base surface at a predetermined angle and said angle changes depending on a distance from the center of said prism means to the location of said each prism and according to a predetermined function of said distance.

6. A method according to claim 5, wherein said each prism comprises a pair of light-refracting surfaces crossing said base surface at such a predetermined angle that said linear real light source gives an appearance of a pair of such linear virtual light sources whose mid-points are spaced from each other by 1.0 to 3.0 mm when the width of said real light source is selected at a value in the range of 0.5 to 1.5 mm.

7. A method according to claim 5, wherein said each prism comprises a first and a second pair of light-refracting surfaces crossing said base surfaces at such a first and a second predetermined angle, correspondingly and respectively, that said real light source gives an appearance of four linear virtual light sources whose mid-points of the adjacent ones are spaced from each other by 0.2 to 1.0 mm, 1.0 to 3.0 mm and 0.2 to 1.0 mm, respectively.

8. A method according to claim 5, wherein said angle changes according to such a predetermined function of the distance that said real light source gives an appearance of a plurality of said virtual light sources whose midpoints of the adjacent ones are spaced from each other by a predetermined constant distance.

9. A method according to claim 5, wherein said angle changes according to such a predetermined function of the distance that said real light source gives an appearance of two virtual light sources whose mid-points are spaced from each other by 0.5 to 1.5 mm when observed from the center of said face plate and by 1.5 to 3.0 mm when observed from the peripheral portion of said face plate, where the width of said real light source is selected at a value in the range of 0.5 to 1.5 mm.

10. A method according to claim 5, wherein said each prism comprises a first and a second pair of light-refracting surfaces crossing said base surface at such a first and a second predetermined angle, correspondingly and respectively, that said real light source gives an appearance of four linear virtual light sources whose mid-points of the adjacent ones are spaced from each other by 0.4 to 0.9 mm, 1.0 to 2.0 mm and 0.4 to 0.9 mm when the width of said real light source is selected at a value in the range of 0.5 to 1.5 mm.

11. An apparatus for forming a phosphor screen of a color picture tube through irradiation with a plurality of virtual linear light sources, comprising a single linear light source disposed in parallel with an inner surface of a face plate of said color picture tube at a predetermined distance from said inner surface, and a prism device including a plurality of prisms juxtaposed adjacent to each other and interposed between said inner surface and said light source so that said light source gives an appearance of a plurality of virtual light sources when observed from every point on the inner surface of said face plate, each of said prisms providing a pair of virtual linear light sources, each having the same width and uniform intensity distribution.

12. An exposure apparatus for forming a phosphor screen on the inner surface of a face plate of a color picture tube, comprising a single real linear light source disposed at a position spaced apart by a predetermined distance from the inner face of the face plate of the color picture tube while extending in parallel therewith, and a prism device disposed between said linear light source and the inner surface of said face plate, said prism device including a plurality of prisms closely arranged so as to constitute a means for causing said single linear real light source to be observed as a plurality of virtual linear light sources from every point on said face plate.

* * * * *